United States Patent [19]
Yeager et al.

[11] Patent Number: 5,938,012
[45] Date of Patent: Aug. 17, 1999

[54] STORAGE BAG WITH MOISTURE EMITTING PAD

[75] Inventors: James W. Yeager; Edward B. Gonzales, both of Mobile, Ala.

[73] Assignee: Innoflex, Incorporated, Mobile, Ala.

[21] Appl. No.: 08/821,668

[22] Filed: Mar. 19, 1997

[51] Int. Cl.⁶ ................................................. B65D 81/24
[52] U.S. Cl. .......................... 206/205; 206/256; 383/210
[58] Field of Search ................................... 206/204, 205, 206/213.1, 242, 256, 258, 260; 312/31, 31.2, 31.3; 131/29; 383/210

[56] References Cited

U.S. PATENT DOCUMENTS

| | | |
|---|---|---|
| 274,954 | 4/1883 | Mason . |
| 290,140 | 12/1883 | Swift . |
| 361,619 | 4/1887 | Cussen . |
| 428,065 | 5/1890 | Boutell . |
| 743,819 | 11/1903 | Brown . |
| 854,820 | 5/1907 | Goodwin . |
| 891,892 | 8/1908 | Langfeld . |
| 1,016,492 | 2/1912 | Gunn . |
| 1,088,369 | 2/1914 | Romano . |
| 1,163,015 | 12/1915 | Keller . |
| 1,241,695 | 10/1917 | Alexander . |
| 1,305,467 | 6/1919 | Hilpert . |
| 1,462,832 | 7/1923 | Shaw . |
| 1,481,971 | 1/1924 | Whiting . |
| 1,506,926 | 9/1924 | Gunter ..................................... 206/242 |
| 1,534,340 | 4/1925 | Bernotow . |
| 1,682,591 | 8/1928 | Babbitt . |
| 1,726,573 | 9/1929 | Lang . |
| 1,871,419 | 8/1932 | McKee . |
| 1,993,394 | 3/1935 | Bangs et al. . |
| 2,010,440 | 8/1935 | Ryan . |
| 2,051,777 | 8/1936 | Purinton et al. . |
| 2,270,603 | 1/1942 | Ridder . |
| 2,329,908 | 9/1943 | Johnson . |
| 2,365,185 | 12/1944 | Gailey . |
| 2,452,957 | 11/1948 | Sabin . |
| 2,505,650 | 4/1950 | Rodman . |
| 2,522,952 | 9/1950 | Krohn . |
| 2,537,196 | 1/1951 | Tanski . |
| 2,545,710 | 3/1951 | Snyder . |
| 2,767,018 | 10/1956 | McDonald . |
| 2,862,779 | 12/1958 | Hammond . |
| 2,977,171 | 3/1961 | Gleason . |
| 3,138,432 | 6/1964 | Kleinhans . |
| 3,338,285 | 8/1967 | Jaster . |
| 3,387,640 | 6/1968 | Butler . |
| 3,801,011 | 4/1974 | Guehler et al. . |
| 3,804,961 | 4/1974 | Cummin et al. . |
| 3,815,828 | 6/1974 | Engel . |
| 3,942,634 | 3/1976 | Gandi et al. ............................ 206/210 |
| 4,079,152 | 3/1978 | Bedrosian et al. . |
| 4,094,119 | 6/1978 | Sullivan . |
| 4,158,440 | 6/1979 | Sullivan et al. . |
| 4,356,969 | 11/1982 | Obermayer et al. . |
| 4,529,125 | 7/1985 | Sullivan . |
| 4,595,101 | 6/1986 | Rivera . |
| 4,657,133 | 4/1987 | Komatsu et al. . |
| 4,709,399 | 11/1987 | Sanders . |
| 4,735,308 | 4/1988 | Barner . |

(List continued on next page.)

Primary Examiner—Paul T. Sewell
Assistant Examiner—Nhan T. Lam
Attorney, Agent, or Firm—Lerner, David, Littenberg, Krumholz & Mentlik, LLP

[57] ABSTRACT

An improved storage bag with moisture emitting pad is disclosed. The bag has a first outer panel, a second outer panel, and an inner panel constructed from plastic film, the panels all being connected together to form a storage bag with a first compartment and a second compartment. Located in the first compartment is a hydrated absorbent pad for emitting moisture vapor that is transmitted through the inner layer into the second compartment. The second compartment is for storing products requiring humidity conditioning. Either or both of the bag compartments could have an opening which could be equipped with a reclosable fastener.

95 Claims, 7 Drawing Sheets

U.S. PATENT DOCUMENTS

| | | |
|---|---|---|
| 4,861,632 | 8/1989 | Caggiano . |
| 4,910,032 | 3/1990 | Antoon, Jr. . |
| 4,932,791 | 6/1990 | Vetter . |
| 4,934,524 | 6/1990 | St. Charles ............................ 206/204 |
| 4,997,082 | 3/1991 | Durocher .............................. 206/204 |
| 5,009,308 | 4/1991 | Cullen et al. . |
| 5,035,731 | 7/1991 | Spruill et al. . |
| 5,037,459 | 8/1991 | Spruill et al. . |
| 5,165,947 | 11/1992 | Colucci et al. . |
| 5,238,306 | 8/1993 | Heintz et al. ........................... 383/63 |
| 5,376,392 | 12/1994 | Ikegami et al. . |
| 5,404,999 | 4/1995 | Bednar . |
| 5,428,346 | 6/1995 | Franklin . |
| 5,454,601 | 10/1995 | Sekine et al. . |
| 5,464,093 | 11/1995 | Hogan ................................... 206/265 |
| 5,509,735 | 4/1996 | May ...................................... 383/210 |
| 5,529,177 | 6/1996 | Podd et al. . |
| 5,540,333 | 7/1996 | Gonzalez et al. ...................... 206/541 |
| 5,607,051 | 3/1997 | Espinosa ............................ 206/213.1 |
| 5,660,868 | 8/1997 | Yeager .................................. 206/204 |
| 5,698,217 | 12/1997 | Wilking ................................. 424/448 |

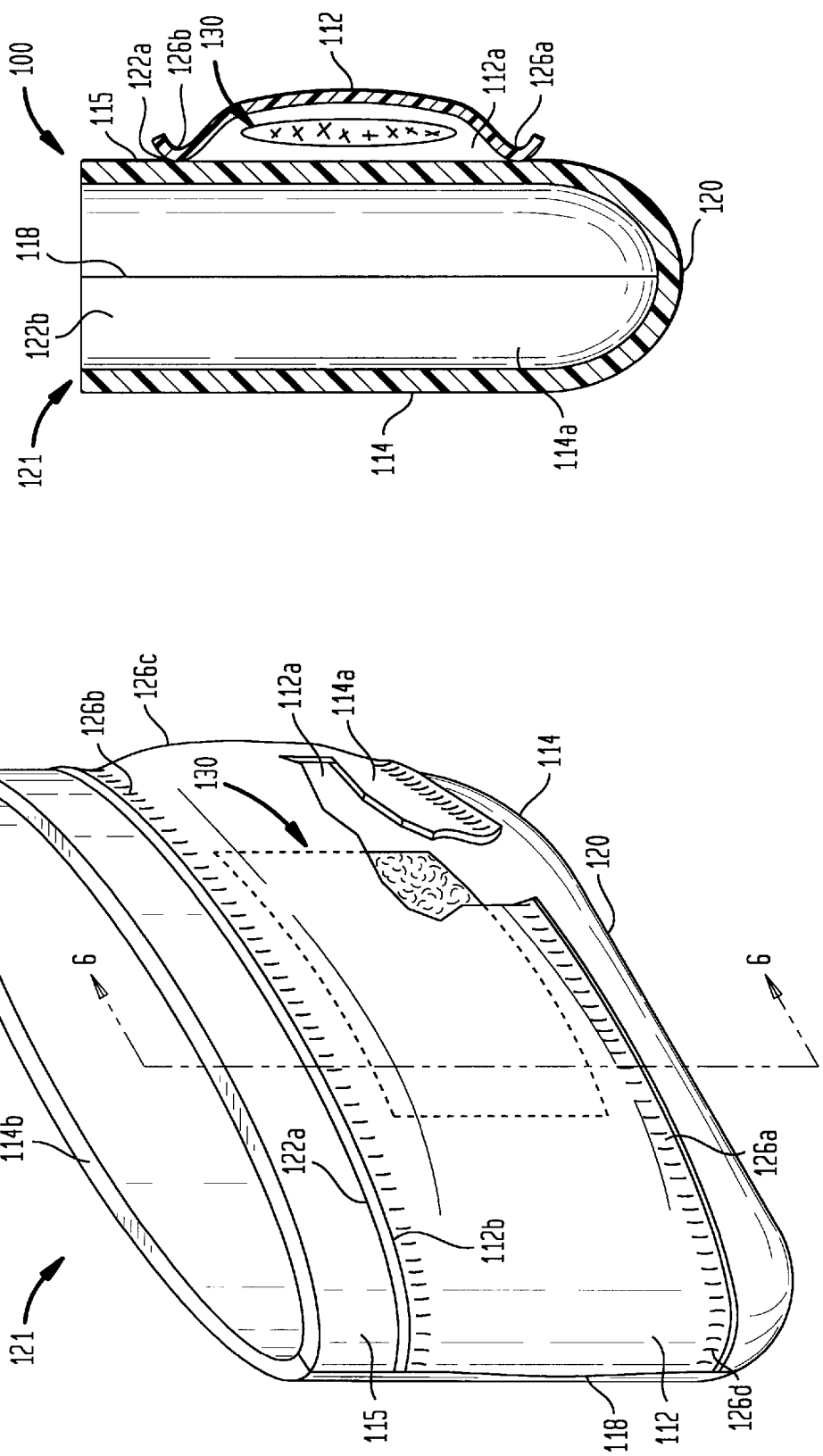

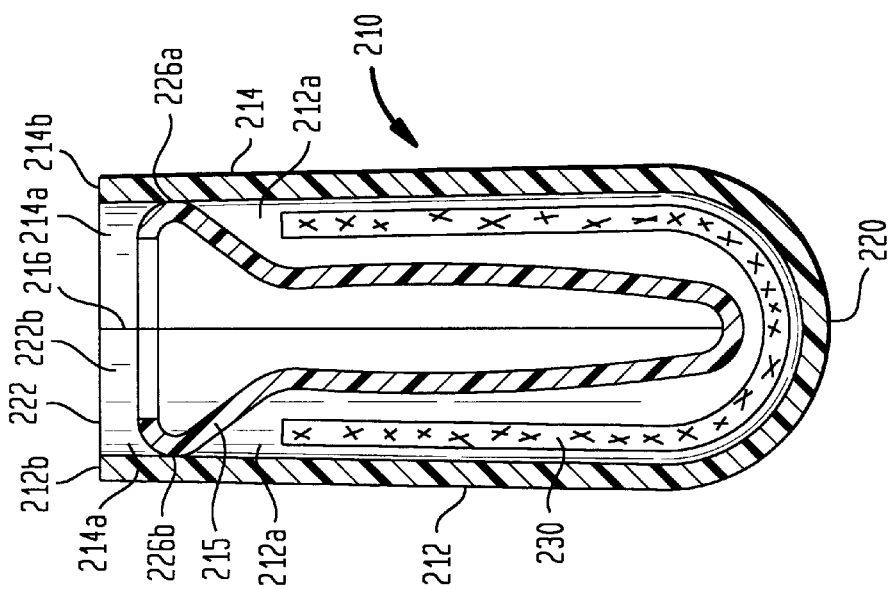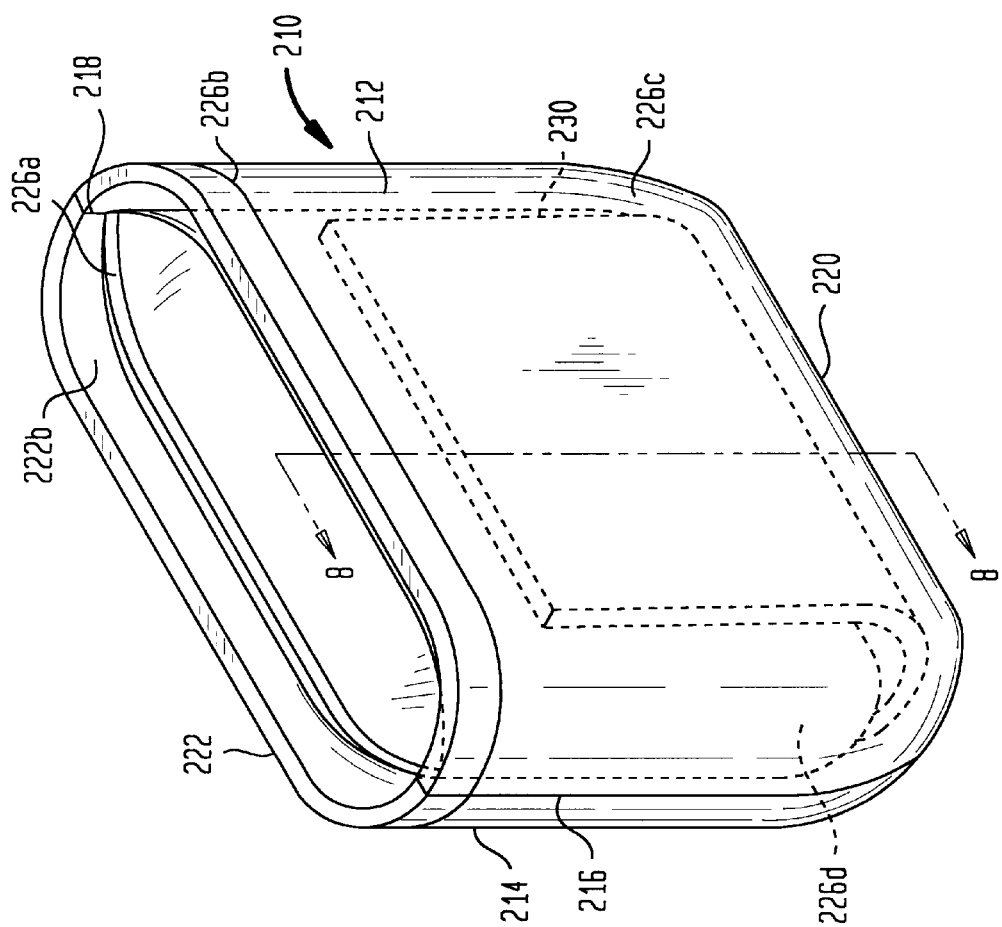

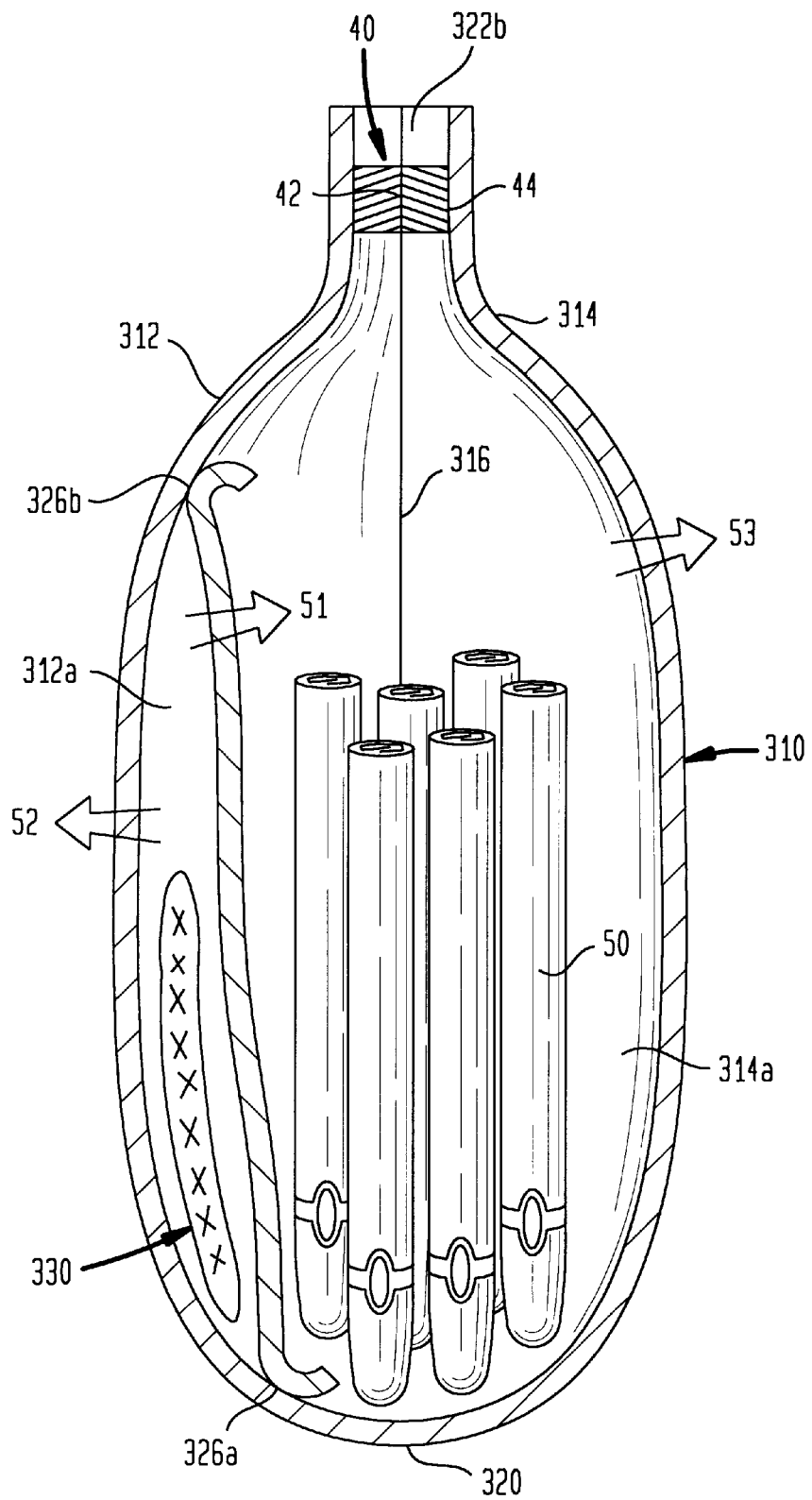

STORAGE BAG WITH MOISTURE EMITTING PAD

BACKGROUND OF THE INVENTION

The invention relates to an improved storage bag for containing products that require a humid environment within the bag. More particularly the storage bag of the present invention provides two compartments, one for containing a moisture emitting pad and a second compartment for containing the product to be stored.

Many products such as tobacco, medical devices, horticulture, and some food products need to be stored in a humid environment. Tobacco products in particular need to be packaged and maintained in a controlled environment, that is, one that remains at a specific level of humidity within a given tolerance range.

When a package or bag for storing humidity sensitive products such as tobacco is meant to be kept outside and therefore exposed to the conditions, of the environment the bag needs to be able to maintain a controlled humidity level within its storage compartment for a extended period of time when experiencing variations in the level of moisture vapor resulting from changes in the relative humidity of the outside environment. To be effective at controlling the level of humidity within a storage bag, when exposed to outside humidity fluctuations found in most parts of the United States as well as in many regions of the world, the bag must be able to compensate for humidity conditions not only below the targeted level but, also conditions above the targeted level. Bags for storing products are normally exposed to these wide swings in ambient humidity conditions only during their distribution from the manufacturing plant to the retail store because once the products reach the retail store they are normally stored in an air conditioned space. A bag for storing humidity sensitive products, that is not meant to be kept outside and is therefore not exposed for long periods of time to the outside humidity conditions of the environment only need to be able to compensate for moderate humidity conditions with very little variation.

In the United States as well as many parts of the world inside human dwellings such as houses, retail stores, and most other enclosed dwellings, as well as most forms of transportation there is typically some form of air conditioning in use at least during the warmer periods of the year. During the cooler times of the year in most climates the humidity level is naturally low, both inside dwellings and outside as well. As a result of the use of air conditioning during warm times and the natural tendency for low humidity in cool times, the average relative humidity level found in most living spaces is less than 50% which is below the level that most products such as tobacco require. Therefore, a bag for storing products that must be maintained at a humidity level that is higher than the humidity level of its surroundings environment need only be able to deal with the problem of replenishing the moisture in the bag that is lost to the dryer surroundings.

For a bag to be able to successfully transmit moisture into its storage compartment for preserving a product such as tobacco the moisture must be transmitted at a slow controlled rate not to exceed a predetermined humidity level so that the compartment does not become over humidified. Inventions such as that of Tanski in U.S. Pat. No. 2,537,196 provides a humidor pouch comprising a perforated inner layer that separates the tobacco in one compartment from moisten paper towels in a second compartment. The perforated inner layer allows the moisture to pass too rapidly from the wet paper to the tobacco causing the tobacco to become over humidified even to the point of becoming wet.

For the foregoing reasons, there is a need for a low cost storage bag for use in moderate humidity environments (preferably less than 50% relative humidity) that has the capability of replenishing moisture within its storage space that is lost to the surrounding environment. The storage bag must be able to transmit the moisture into its storage space at a slow controlled rate not to exceed a predetermined humidity level so that the compartment does not become over humidified. In addition the bag should carry out these functions for an extended period of time.

SUMMARY OF THE INVENTION

It is accordingly an object of the present invention to provide a low cost storage bag with the ability to create a humid environment within its storage compartment for the preservation of humidity sensitive products such as tobacco, medical devices, horticulture and certain food products.

A further object of the bag of the present invention is to prevent the product being stored from becoming wet or over humidified even when stored for long periods of time in moderate humidity conditions.

An even further object of the present invention is to maintain a targeted humidity level within the storage compartment of the bag for a extended period of time when exposed to moderate levels of relative humidity like are normally found in human living spaces.

In accordance with the present invention, there is provided a storage bag with moisture emitting pad. The bag comprises a first outer panel, a second outer panel and an inner panel all constructed from plastic film, the panels all being connected together to form a storage bag with a first compartment and a second compartment. Located in the first compartment is a hydrated absorbent pad for emitting moisture vapor. The second compartment is for storing products requiring humidity conditioning. A perimeter is formed around the first compartment by connecting the inner panel to at least one of the outer panels at a continuous seam thereby totally enclosing the moisture vapor emitting pad. A perimeter is formed around the second compartment by connecting the second outer panel to the first outer panel at a continuous seam along all but one portion of the perimeter which in turn creates a bag opening. The bag opening is utilized for introducing products into the storage compartment of the bag and is then preferably closed off. The first compartment could also have a gap in the continuous seam around its perimeter creating a bag opening in the first compartment. Therefore, the vapor emitting pad could be placed into the first compartment through the first bag opening and later closed off. Both bag openings could have reclosable fasteners made into their openings so the compartments could be selectively opened and closed making the storage bag reusable since the absorbent pad could be replaced when needed.

The storage bag of the present invention fulfills the need for a low cost storage bag that can establish and maintain the proper humidity level when exposed to a dry to moderately humid environment and therefore avoid over humidification or dehydration of the stored product by providing a bag with two compartments, one compartment for containing a hydrated absorbent pad for emitting moisture vapor and a second compartment for storing the product that requires a controlled humidity level. The inner panel between the two compartments is made of a plastic film with the physical and chemical properties required to control the flow of moisture vapor from the pad compartment to the storage compartment to a low enough rate whereby over humidification does not occur in the storage compartment. The two outer panels of the storage bag are made of a plastic film with the proper physical and chemical properties required to control the flow of moisture vapor out of both compartments of the bag into the environment so that the humidity level in the storage compartment will not build to an excessive level.

In accordance with one embodiment of the present invention there is described an improved storage bag in combination with a moisture emitting pad. The invention includes a bag having a first outer panel, a second outer panel and an inner panel constructed from plastic film, the panels all being connected together by substantially continuous seams to form a storage bag with a first compartment and a second compartment; a first perimeter formed around the first compartment by the first outer panel being connected to the inner panel at a continuous seam along all but one portion of the first perimeter thereby creating a first bag mouth; a second perimeter formed around the second compartment by the second outer panel being connected to the inner panel at a continuous seam along all but one portion of the second perimeter thereby creating a second bag mouth; hydrated pad means located in the first compartment for emitting moisture vapor, the first compartment being greater than 95% relative humidity, whereby the moisture vapor has the ability to flow out of the first compartment without the ability for substantially any moisture vapor to flow into the first compartment; the first bag mouth being closeable by connecting the first outer panel to the inner panel thereby totally enclosing the pad means the inner panel having a moisture vapor transmission rate relative to a moisture vapor transmission rate of the second panel whereby the flow of moisture vapor into the second compartment from the first compartment relative to the flow of moisture vapor out of the second compartment into the surrounding environment causes the relative humidity of the second compartment to reach a predetermined level when the storage bag is in a surrounding environment having a relative humidity that is lower than the relative humidity of the first compartment; the inner panel having a moisture vapor transmission rate in the range of about 0.3 to about 5.0 grams/mil/24 hours/100 square inches; and the second outer panel having a moisture vapor transmission rate in the range of about 0.3 to about 5.0 grams/mil/24 hours/100 square inches.

In accordance with another embodiment of the present invention there is described a storage bag in combination with a moisture emitting pad for humidifying tobacco products. The storage bag includes a bag having a first outer panel, a second outer panel, and an inner panel therebetween constructed from polymer film, the panels being connected together to form the storage bag with a first compartment and a second compartment, a moisture vapor emitting hydrated pad located in first the compartment, the first compartment being greater than 95% relative humidity, whereby the moisture vapor has the ability to flow out of the first compartment without the ability for substantially any moisture vapor to flow into the first compartment; the inner panel having a moisture vapor transmission rate relative to the moisture vapor transmission rate of the second outer panel whereby the flow of moisture vapor into the second compartment from the first compartment relative to the flow of moisture vapor out of the second compartment into the surrounding environment causes the relative humidity of the second compartment to be maintained between about 62% to about 78% when the storage bag is maintained in a surrounding environment having a relative humidity in the range between about 20% and about 60%; the inner panel formed from a polymer film in the range of about 14 mils. thick and having a moisture vapor transmission rate in the range of about 0.3 to about 5.0 grams/mil/24 hours/100 square inches; and the second outer panel formed from a polymer film in the range of about 1–4 mils. thick and having a moisture vapor transmission rate in the range of about 0.3 to about 5.0 grams/mil/24 hours/100 square inches.

In accordance with another embodiment of the present invention there is described a storage bag in combination with a moisture emitting pad for humidifying products stored therein. The invention includes a bag having a first outer panel, a second outer panel, and an inner panel therebetween constructed from plastic film, the panels being connected together by seams to form a storage bag with a first compartment and a second compartment; a moisture vapor emitting pad located in the first compartment; the inner panel and the second outer panel being formed from a plastic film having a moisture vapor transmission rate whereby the flow of moisture vapor out of the second compartment into the surrounding environment causes the relative humidity of the second compartment to reach a predetermined level when the storage bag is maintained in a surrounding environment having a relative humidity that is lower than the relative humidity within the first compartment; and the moisture vapor transmission rate of the second outer panel being sufficient whereby the second compartment relative humidity is affected by the relative humidity of the surrounding environment, with the relative humidity of the second compartment being directly proportional to, but not equal to, the relative humidity of the surrounding environment when the storage bag is at equilibrium.

In accordance with another embodiment of the present invention there is described a storage bag in combination with a moisture emitting pad for humidifying products stored therein. The combination includes a bag constructed from polymer material forming a first compartment for storing a product therein and a second compartment storing a moisture emitting pad therein, the bag including an outer panel of polymer material separating the first compartment from the surrounding environment and an inner panel of polymer material separating the first compartment from the second compartment, and the inner panel having a moisture vapor transmission rate relative to the moisture vapor transmission rate of the outer panel whereby the flow of moisture into the first compartment from the second compartment relative to the flow of moisture out of the first compartment into the surrounding environment maintains the relative humidity of the first compartment within a predetermined range higher than the relative humidity of the surrounding environment and lower than the relative humidity in the second compartment.

Other objects, advantages and features will become more apparent with the teaching of the principles of the invention in connection with the disclosure of the preferred embodiments described in the specification, claims, and drawings.

BRIEF DESCRIPTION OF THE DRAWINGS

FIG. 5 is a partly cutaway perspective view of a second preferred embodiment of the bag of the present invention;

FIG. 6 is a cross-section view of the bag of FIG. 5 taken along lines 6—6 of FIG. 5;

FIG. 7 is a partly cutaway perspective view of a third preferred embodiment of the bag of the present invention;

FIG. 8 is a cross-section view of the bag of FIG. 7 taken along lines 8—8 of FIG. 7.

BRIEF DESCRIPTION OF THE PREFERRED EMBODIMENTS

Figure 2:
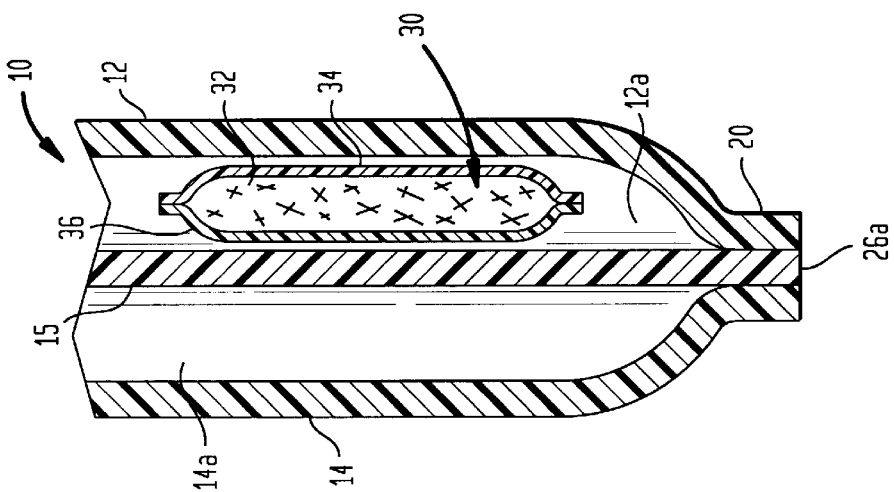
FIG. 2 is a partly cutaway, cross-section view of the bag of FIG. 1 taken along lines 2—2 of FIG. 1.
Figure 1:
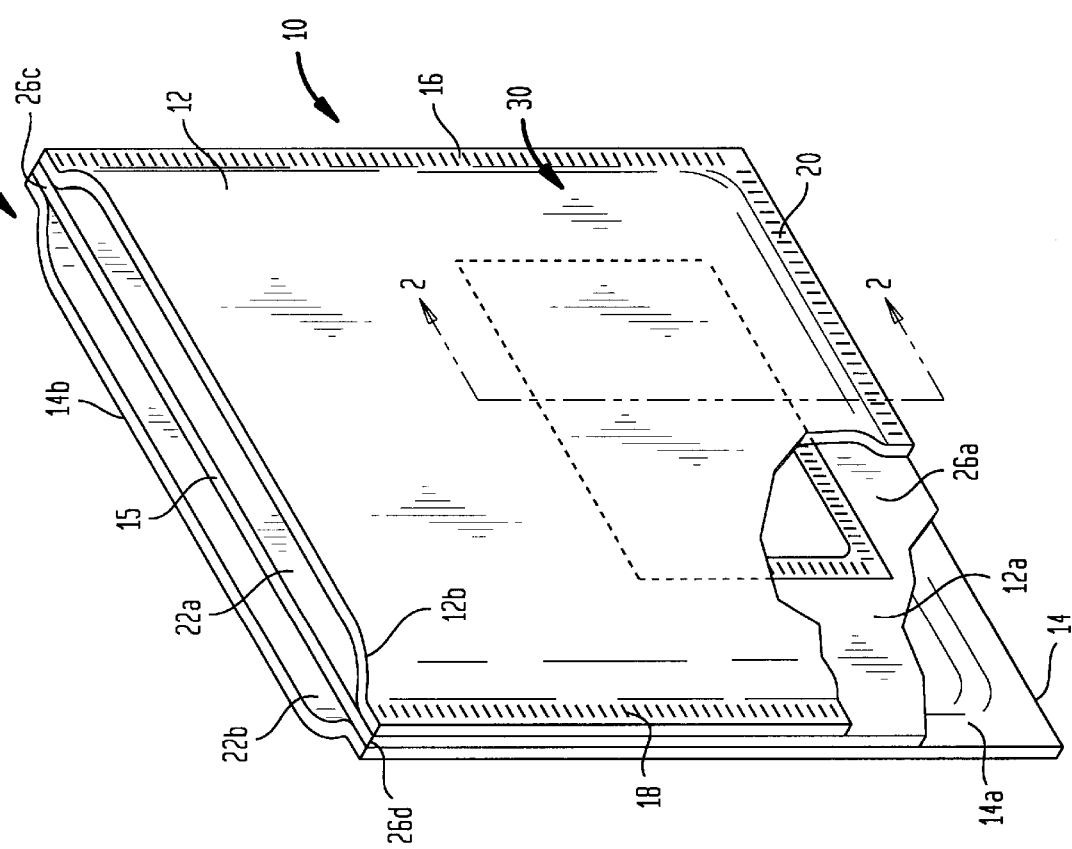
FIG. 1 is a partly cutaway perspective view of a first preferred embodiment of the bag of the present invention.
Figure 4:
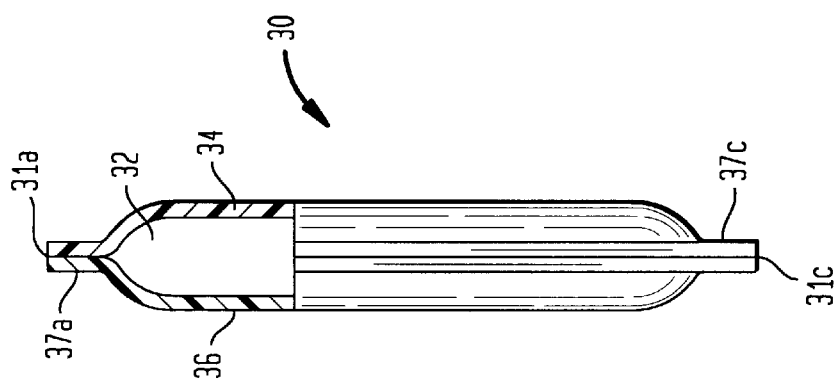
FIG. 4 is a cross-section view of the moisture emitting pad of FIG. 3 taken along lines 4—4 of FIG. 3.

Referring now to the drawings, in FIG. 1 and FIG. 2 is shown the preferred embodiment of the storage bag of the present invention generally indicated by the numeral 10. Bag 10 has a first outer panel 12, a second outer panel 14, and an inner panel 15 which are preferably made from separate pieces of plastic film. First outer panel 12 is joined to one side of inner panel 15 by side seams 16 and 18 and by bottom seam 20 to form a first compartment 12a. A second outer panel 14 is joined to the other side of inner panel 15 by side seams 16 and 18 and by bottom seam 20 to form a second compartment 14a. Side seams 16 and 18 preferably intersect bottom seam 20 and top 21 perpendicularly to create a substantially rectangularly shaped bag. Although any shape known in the art could be utilized to make bag 10 of the present invention.

First outer panel 12 has a first top edge 12b which is not connected to inner panel 15 and second outer panel 14 has a second top edge 14b which is not connected to inner panel 15. First top edge 12b is located at substantially the same distance from the bottom seam 20 of bag 10 as is second top edge 14b. Although both first top edge 12a and second top edge 14a would not need to be located at the same distance from bottom seam 20 if desired.

Thus, a first opening 22a is formed between first outer panel 12 and inner panel 15 and a second opening 22b is formed between second outer panel 14 and inner panel 15. Goods such as tobacco, medical, horticulture, and food products, or any other item requiring a humidity controlled storage space may be inserted into the inside of the second compartment 14a of bag 10 through opening 22b. Preferably, bag 10 is used to contain and store tobacco. The tobacco may be in the form of cigars or cigarettes, or the tobacco may be in its raw form.

Located inside the first compartment 12a of bag 10 is a loosely held hydrated absorbent pad 30 for emitting moisture vapor to preserve the goods stored in the second compartment 14b of bag 10. Although it is preferred that moisture vapor emitting pad 30 may be loosely contained or held in first compartment 12b and therefore be free to move therein, pad 30 could be connected to the panels forming first compartment 12a to prevent movement therein if desired. First compartment 12a is closed off by connecting first outer panel 12 to inner panel 15 along first top edge 12b thereby totally enclosing pad 30.

The first compartment 12a and second compartment 14a could have reclosable or resealable strips attached to their openings 12b and 14b thereby making bag 10 a reclosable bag. Any such flexible closure strips for use with packaging could be used with the bag of the present invention. Their are many known flexible closure strips in the art that allow for selected opening and closing of the bags when needed. The two most common types of closures used in the art use either matched interlocking plastic profiled fastener strips as shown U.S. Pat. No. 3,338,285 or use resealable adhesive strips as shown in U.S. Pat. No. 4,709,399. U.S. Pat. No. 3,338,285 and U.S. Pat. No. 4,709,399 are hereby incorporated by reference.

Inner layer 15 is connected at seam 26a to first outer panel 12 and to second outer panel 14. Preferably, inner layer 15 is connected along its sides 26c and 26d shown in FIG. 1 to side seams 16 and 18 of bag 10. However, if desired, inner layer 15 could be narrower than the width of bag 10. Preferably seams 26a, 16, and 18 are continuous to the point of being hermetic, that is being as is known in the art substantially air tight. Inner layer 15 is preferably made from a plastic film with a moisture vapor transmission rate that is greater that the moisture vapor transmission rate of the first and second outer layers 12 and 14.

Pad 30 for emitting moisture vapor could be made by hydrating a conventional absorbent pad, such absorbent pads are well known in the art and may be made from a variety of fluid absorbing materials. Pad 30 may be made from manufactured or synthetic fibers, or natural fibers, or a combination thereof, either woven or non-woven. Preferably, the absorbent material fibers of pad 30 are formed from cellulose materials such as paper or the like.

Figure 3:
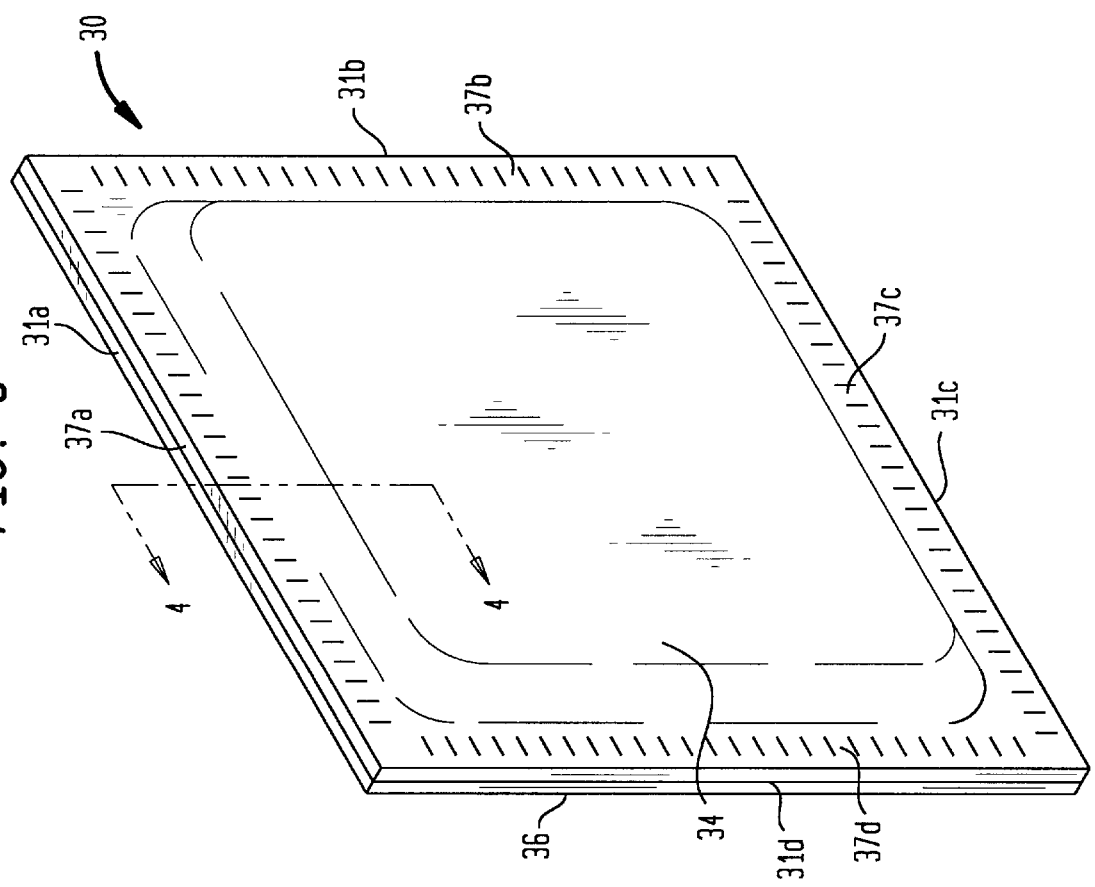
FIG. 3 is a perspective view of a first preferred embodiment of the moisture vapor emitting pad of the present invention.

As is best shown in FIG. 3 preferably moisture vapor emitting pad 30 is generally rectangularly shaped with a first edge 31a, a second edge 31b, a third edge 31c, and a fourth edge 31d. Although pad 30 is preferably rectangular any shape known in the art could be utilized to make pad 30 of the present invention.

The moisture vapor emitting pad 30 comprises a hydrated cellulose inner body 32 that has been hydrated by using preferably distilled water and then is totally enclosed by a plastic covering 31. The plastic covering 31 is formed by a first layer 34 of plastic film and a second layer 36 of plastic film that are joined together along a continuous first seam 37a at first edge 31a, a continuous second seam 37b at second edge 31b, a continuous third seam 37c at third edge 31c, and a continuous fourth seam 37d at forth edge 31d. Preferably seams 37a, 37b, 37c, and 37d are continuous to the point of being hermetic.

The moisture vapor emitting pad 30 has a first layer 34 that is made from a plastic film with a thickness that is preferably less than 0.004 of inch and has a moisture vapor transmission rate that is greater that the moisture vapor transmission rate of the second layer 36. Although, both first layer 34 and second layer 36 could be made from plastic film with the exact same moisture vapor transmission rate. Moisture vapor transmission rate (MVTR) is also referred to in the art as water vapor transmission rate (WVTR) and the procedure for testing films is also well known as ASTM E96 (ASTM=American Society of Test Methods). It is well known that MVTR varies with temperature and it should be understood that all values of MVTR found in this application were tested at 23 degrees Centigrade. The appropriate units of measurement for moisture vapor transmission rate are gm-mil/100 sq. in./24 hr. that is, the number of grams of moisture transmitted through a film per mil(0.001 inch) of thickness per 100 square inches of surface area per a 24 hour period. The moisture vapor transmission rate of a plastic film is determined by the physical properties and the chemical properties such as its surface area, thickness, density, and amount of crystallinity. The moisture vapor transmission rate of a thermoplastic film is directly proportional to its surface area and inversely proportional to its thickness, density, and crystallinity. The moisture vapor transmission rate for the first layer 34 is preferably greater than 1.0 gm-mil and less than 5.0 gm-mil/100 sq. in./24 hr. Films with moisture vapor transmission rates greater than 5 gm-mil/100 sq. in./24 hr. allow moisture vapor to flow so rapidly out of the pad into the storage compartment they have the potential for over humidifying the stored product as well as prematurely shortening the life of the pad. The moisture vapor transmission rate for the second layer 36 is preferably less than 1.0 gm-mil/100 sq. in./24 hr. Pad 30 is preferably positioned in first compartment 12a with the second layer 34 with the higher moisture vapor transmission properties facing towards the inner layer 15. The pad 30 placed in this position will have more of a tendency to transmit moisture from pad 30 towards the second compartment 14a.

Although it is preferred, it is not necessary that the pad 30 be covered with plastic film because the pad utilized in the present invention is contained in plastic film compartment 12a and will not come in direct contact with the goods contained in bag 10. Thus, inexpensive pads 30 made from absorbent materials having no plastic film cover attached thereto may be used in the bag 10 of the present invention without wetting the goods contained in bag 10. When using the preferred embodiment of pad 30 the film layers 34 and 36 provide additional opportunity for controlling the flow of moisture vapor from the pad 30 into the second compartment 14a of bag 10.

FIG. 5 and FIG. 6 illustrates a second preferred embodiment of the storage bag of the present invention, wherein features of the bag corresponding to those of the previously described embodiment are designated by like reference numerals in the one-hundred series. Bag 110 has a first outer panel 112 which is preferably made from a separate piece of plastic film. Bag 110 has a second outer panel 114 and a inner panel 115 which are made from the same piece of plastic film. First outer panel 112 is joined to the inner panel 115 by side seams 116 and 118 and to the surface of the first outer panel 112 at or near bottom fold 120 by seam 126a to form a first compartment 112a. A second compartment 114a is formed by joining the second outer panel 114 to the first outer panel 112 by side seams 116 and 118 and by bottom fold 120. Side seams 116 and 118 preferably intersect bottom fold 120 and top 121 perpendicularly to create a substantially rectangularly shaped bag. Although any shape known in the art could be utilized to make bag 110 of the present invention.

First outer panel 112 has a first top edge 112b and second outer panel 114 has a second top edge 114b which is not connected to inner panel 115. First top edge 112b is not located the same distance from the bottom fold 120 of bag 110 as is second top edge 114b. Although both first top edge 112a and second top edge 114a could be located at the same distance from bottom fold 120 if desired.

Thus, an opening 122b is formed between first outer panel 112 and second outer panel 114. Goods such as tobacco, medical devices, food products, horticulture products, or any other item requiring a humidity controlled storage space may be inserted into the inside of the second compartment 114a of bag 110 through opening 122b. Preferably, bag 110 is used to contain and store tobacco. The tobacco may be in the form of cigars or cigarettes, or the tobacco may be in its raw form.

Located inside the first compartment 112a of bag 110 is a loosely held hydrated absorbent pad 130 for emitting moisture vapor to preserve the goods stored in the second compartment 114a of bag 110. Although it is preferred that fluid absorbing pad 130 may be loosely contained or held in first compartment 112a and therefore be free to move therein, pad 130 could be connected to the panels forming first compartment 112a to prevent movement therein if desired. First compartment 112a is closed off at seam 126b by connecting first panel 112 to inner panel 115 along first top edge 112b thereby totally enclosing pad 130. Preferably seams 126a, 126b, 116, and 118 are continuous to the point of being hermetic. By using distilled water as the hydrator and enclosing the moisture emitting pad in a hermetically sealed compartment funguses such as mold and mildew are unlikely to form an the pad 130 such as with the prior art of Tanski. Although, the preferred method of controlling fungus growth in bag 110 is the totally enclosing of pad 130 in first compartment 112 as described above other fungus control techniques are within the purview of the present invention such as the use of fungicidal reagents. The fungicidal reagents can be incorporated into the films that produce the panels of the bag or pad as well as into the absorbent materials that make up the pad.

Shown in FIG. 5, inner panel 115 is connected to the surface of the first outer panel 112 along the continuous seam 126a that is substantially perpendicular to sides 126c and 126d of bag 110 with seam 126a spanning continuously between side seams 116 and 118. Preferably, inner panel 115 is connected to the sides 126c and 126d along continuous side seams 116 and 118 of bag 110. However, if desired, inner panel 115 could be narrower than the width of bag 110. Inner panel 115 is preferably made from a plastic film with a moisture vapor transmission rate that is greater that the moisture vapor transmission rate of the first outer panel 112. The moisture vapor transmission rate for the inner panel 115 is preferably greater than 0.9 gm-mil/100 sq. in./24 hr. but less than 3.0 gm-mil/100 sq. in./24 hr. when tested as per ASTM E96. Preferably inner panel 115 is less than 0.004 of an inch in thickness. More preferably inner panel 115 is made from a conventional film grade low density polyethylene that is between 0.0015 and 0.003 of an inch thick.

In FIG. 5 and 6, seam 126a is shown connected to first outer panel 112 a short distance from the bottom fold 120 of bag 110. If desired, seam 126a could be located a greater distance from the bottom fold 120 than shown in FIG. 5 and 6. Furthermore, if desired, seam 126a could be located adjacent to bottom fold 120.

Pad 130 for emitting moisture vapor is made by hydrating a conventional absorbent pad such absorbent pads are well known in the art and may be made from a variety of fluid absorbing materials. Pad 130 may be made from manufactured or synthetic fibers, or natural fibers, or a combination thereof, either woven or non-woven, which has been hydrated. Preferably, the absorbent material fibers of pad 130 are formed from cellulose materials such as paper or the like.

FIG. 7 illustrates a third preferred embodiment of the storage bag of the present invention, wherein features of the bag corresponding to those of the previously described embodiment are designated by like reference numerals in the two-hundred series. Bag 210 has a first outer panel 212 and a second outer panel 214 which are preferably made from the same piece of plastic film and an inner panel 215 which is made from a separate piece of plastic film. A first compartment is formed by joining the inner layer 215 to the surface of the first outer panel 212 at a first continuous seam 226a and to the surface of the second outer panel 214 at a second continuous seam 226b and at continuous side seams 216 and 218. Seams 226a and 226b span continuously between side seams 216 and 218 and are perpendicular to sides 226c and 226d. Preferably first seam 226a that joins first outer panel 212a to inner panel 215 is located at or near a first top edge 212b of first outer panel 212. Also preferably second seam 226b that joins second outer panel 214a to inner panel 215 is located at or near a second top edge 214b of first outer panel 214. Inner panel 215 being joined to the first outer panel 212 and the second outer panel 214 at side seams 216 and 218 thereby forms a totally enclosed first compartment 212a. Preferably seams 226a, 226b, 216, and 218 are continuous to the point of being hermetic. A second compartment 214a is formed by joining the second outer panel 214 to the first outer panel 212 by side seams 216 and 218 and by bottom fold 220. At the top 222 of compartment 214a a top opening 222b is formed in bag 210 between first outer panel 212 and second outer panel 214.

Located in the second compartment 212a is moisture vapor emitting pad 230. Pad 230 for emitting moisture vapor is made by hydrating a conventional absorbent pad, such absorbent pads are well known in the art and may be made from a variety of fluid absorbing materials. Pad 230 may be made from manufactured or synthetic fibers, or natural fibers, or a combination thereof, either woven or non-woven, which has been hydrated. Preferably, the absorbent material fibers of pad 230 are formed from cellulose materials such as paper or the like.

Pad 230 as shown in FIG. 7 is large enough to fill substantially all the space of first compartment 212a so as to substantially surround the second compartment 214a and therefore substantially surround the product stored within second compartment 214a. Since pad 230 substantially surrounds the stored product and is made from preferably cellulose and the like which is also a good material to act as a protective padding, bag 210 could also provide the additional benefit of cushioning the stored product.

FIG. 9 illustrates a fourth preferred embodiment of the storage bag of the present invention, wherein features of the bag corresponding to those of the previously described embodiment are designated by like reference numerals in the three-hundred series. Bag 310 has a first outer panel 312 and a second outer panel 314 which are preferably made from the same piece of plastic film and an inner panel 315 which is made from a separate piece of plastic film. A first compartment is formed by joining the inner panel 315 to the first outer panel at side seams 316 and 318(not shown) and at or near bottom fold 320 by seam 326a to form a first compartment 312a. A second compartment 314a is formed by joining the second outer panel 314 to the first outer panel 312 by side seams 316 and 318 and by bottom fold 320. Thus, an opening 322b is formed in bag 310 between first outer panel 312 and second outer panel 314.

Located in the second compartment 312a is moisture vapor emitting pad 330. Pad 330 for emitting moisture vapor is made by hydrating a conventional absorbent pad, such absorbent pads are well known in the art and may be made from a variety of fluid absorbing materials. Pad 330 may be made from manufactured or synthetic fibers, or natural fibers, or a combination thereof, either woven or non-woven, which has been hydrated. Preferably, the absorbent material fibers of pad 330 are formed from cellulose materials such as paper or the like. Cigars 50 are shown inside of the second compartment 314a of bag 310.

Shown in FIG. 9 is a flexible plastic profiled reclosable fastener strip assembly 40 attached to bag 310 at opening 322b The fastener strip assembly 40 comprises a male profile strip 42 and a female profile strip 44 that are shown in FIG. 9 to be interlocked. Fastener strip 40 can be selectively opened and reclosed thereby making the second compartment of bag 10 reclosable.

Also shown in FIG. 9 are the directions of flow of moisture vapor in and out of bag 310. Moisture vapor released from pad 330 fills the first compartment 312a to create an environment with a relative humidity level of preferably greater than 95%. The first flow 51 of moisture vapor will occur between the first compartment 312a and the second compartment 314a of bag 310 through inner layer 315 as a result of the humidity level in the second compartment 314a being well below the humidity level (95% plus) of the first compartment 312a The relative humidity of the second compartment 314a will probably begin at ambient conditions (40 to 50%) or at the targeted condition required of the particular product being stored. In the case of tobacco the target is about 70% relative humidity at 70 degrees Fahrenheit. Since the air conditioned environment surrounding bag 310 will normally be below 50% relative humidity, a second flow 52 of moisture vapor will occur from the first compartment 312a through the first outer layer 312 into the surrounding environment. The rate of the first flow 51 of moisture vapor from the first compartment 312a into the second compartment 314a could be less than, greater than, or equal to the rate of the second flow 52 of moisture vapor from the first compartment 312a into the environment outside bag 310. This is because the barrier resisting first flow 51 between the first compartment 312a and the second compartment 314a is determined by the moisture vapor transmission properties of the inner panel 315 which can be greater than, less than, or equal to the moisture vapor transmission properties of the first outer 312 which creates the barrier to second flow 52 between the first compartment 214a and the surrounding environment. Preferably the rate of the first flow 51 of moisture vapor from the first compartment 312a into the second compartment 314a would be greater than the rate of the second flow 52 of moisture vapor from the first compartment 312a into the environment outside bag 310.

The second compartment 314a has a third flow 53 of moisture vapor that occurs from the second compartment 314a through second outer panel 314 into the surrounding environment. The rate of the third flow 53 of moisture vapor can be less than, greater than, or equal to the rate of the second flow 52 of moisture vapor because the moisture vapor barrier transmission properties of the second outer panel 314 can be greater than, less than, or equal to the moisture vapor barrier transmission properties of the inner panel 315. The relative humidity level within the second compartment 314 rises as more moisture passes into the second compartment 314a from the first compartment 312a than passes from the second compartment 314a into the surrounding environment. This occurs because the relative humidity differential between the first compartment 312a and the second compartment 314a is greater than the humidity differential between the second compartment 314a and the surrounding environment.

When bag 310 is designed so that the second outer layer 314 and the inner layer 315 have the same exact moisture vapor transmission properties, that is a film with the same chemical and physical properties, the relative humidity in the second compartment 314a will continue to increase until it reaches the midpoint between the ambient humidity outside the bag and the humidity inside the first compartment 312a. This occurs because the natural driving force(the relative humidity differential) causing moisture to flow between the first compartment 312a and the second compartment 314a and the resistance to the flow (moisture vapor transmission barrier properties) are identical.

It is in the purview of the present invention to create bags whereby the storage compartment humidity level will either lead or lag the midpoint of the difference of the relative humidity differential between the moisture emitting compartment and the storage compartment by varying the moisture vapor transmission properties of the inner and outer panels of the bag of the invention. This will result in a relative humidity level within the storage compartment that is either greater than or less than the midpoint between the level of relative humidity inside the compartment containing the moisture emitting pad and the surroundings. Following is an explanation of two experiments that prove the above stated theory.

Two sample bags were prepared and tested to prove that the humidity inside the storage compartment of the bag of the present invention could be maintained at a targeted level within a reasonable range. The first bag labeled Bag Sample No. 1 was tracked over a thirty six day period whereby the relative humidity of the first compartment, the second compartment, and the ambient conditions were recorded. Bag Sample No. 1 was constructed according to FIG. 1 and 2 with a targeted relative humidity in the storage compartment of 65%. The first outer panel of Bag Sample No. 1 was constructed from a two layer high density polyethylene film with a thickness of 0.003 inch and with a moisture vapor transmission rate of approximately 0.3 gm-mil/100 sq. in./24 hr. resulting in a MVTR of the first outer layer of about 0.1 gm-mil/100 sq. in./24 hr. as approximated by the relationship of MVTR divided by the thickness. The first outer panel was made by the blown extrusion process and the two layers were adhesively connected together by a lamination process. Both the blown film process and the adhesive lamination process are well known in the art. The first outer panel is preferably made from a substantially higher moisture barrier film than the other panels of the bag as to minimize the loss of moisture from the pad directly into the surroundings whereby the life of the pad and therefore the bag are not prematurely shortened. The inner panel and the second outer panel were both constructed from a monolayer low density polyethylene blown film with a thickness of 0.003 inch and a moisture vapor transmission rate of approximately 1.2 gm-mil/100 sq. in./24 hr resulting in an approximate MVTR for each panel of 0.4 gm/100 sq. in./24 hr.

The tests of both Bag Samples were conducted in Mobile, Ala. during February and March inside a residential dwelling. The data for both Bag Samples No. 1 and 2 have been divided into five categories. The first category is titled DAY and is the day (in consecutive order) the data was recorded. The second category is titled 1ST COMP. RH and is the percent relative humidity of the first compartment. The third category is titled 2ND COMP. RH and is the percent relative humidity of the second compartment. The fourth category is titled AMBIENT RH and is the percent relative humidity of the conditions surrounding the bag. The fifth category is titled RH DELTA and is calculated according to the following formula;

RH DELTA=[(RH2-RHA)-(RH1-RH2)]

whereby; RH1=relative humidity of the first compartment
RH2=relative humidity of the second compartment
RHA=relative humidity of the ambient conditions The results for Bag Sample No. 1 are shown numerically in Table 1 below and graphically in FIG. 9A.

TABLE 1

| DAY | 1ST COMP. RH (Percent) | 2ND COMP. RH (Percent) | AMBIENT RH (Percent) | RH DELTA |
|---|---|---|---|---|
| 1 | 86 | 63 | 50 | -10 |
| 2 | 97 | 67 | 48 | -11 |
| 3 | 98 | 67 | 41 | -5 |
| 4 | 98 | 66 | 34 | 0 |
| 5 | 98 | 67 | 40 | -4 |
| 6 | 98 | 69 | 41 | -1 |
| 7 | 98 | 65 | 32 | 0 |
| 8 | 98 | 65 | 32 | 0 |
| 9 | 98 | 63 | 29 | -1 |
| 10 | 98 | 62 | 29 | -3 |
| 11 | 98 | 63 | 30 | -2 |
| 12 | 98 | 63 | 31 | -3 |
| 13 | 98 | 64 | 32 | -2 |
| 14 | 98 | 65 | 35 | -3 |
| 15 | 98 | 67 | 37 | -1 |
| 16 | 98 | 67 | 37 | -1 |
| 17 | 98 | 66 | 35 | -1 |
| 18 | 98 | 64 | 30 | 0 |
| 19 | 98 | 64 | 31 | -1 |
| 20 | 98 | 63 | 30 | -2 |
| 21 | 98 | 64 | 31 | -1 |
| 22 | 98 | 64 | 32 | -2 |
| 23 | 98 | 66 | 37 | -3 |
| 24 | 98 | 68 | 41 | -3 |
| 25 | 98 | 68 | 43 | -5 |
| 26 | 98 | 70 | 48 | -6 |
| 27 | 98 | 68 | 42 | -4 |
| 28 | 98 | 73 | 52 | -4 |
| 29 | 98 | 73 | 43 | 5 |
| 30 | 98 | 71 | 40 | 4 |
| 31 | 98 | 69 | 36 | 4 |
| 32 | 98 | 68 | 36 | 2 |
| 33 | 98 | 69 | 41 | -1 |
| 34 | 98 | 69 | 41 | -1 |
| 35 | 98 | 70 | 41 | 1 |
| 36 | 98 | 74 | 45 | 5 |

Figure 9A:
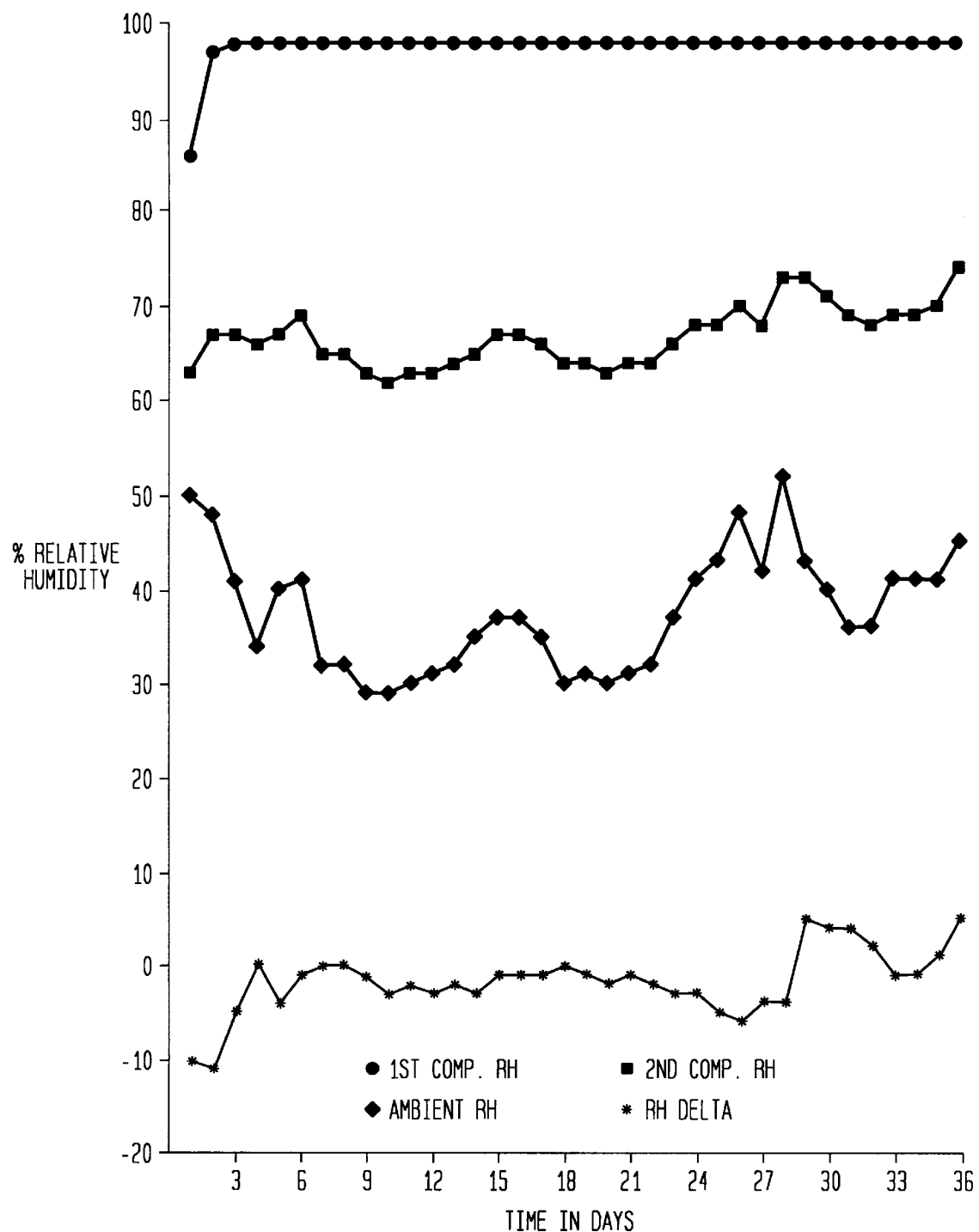
FIG. 9 is a cutaway view of a fourth preferred embodiment of the bag of the present invention.

Table 1 and the graphs of FIG. 9A show that the relative humidity of the first compartment was a constant 98% throughout the test except during the initial start-up period of the first two days. The ambient conditions outside Bag Sample No. 1 varied from a low of 29% to a high of 52% with a mean of 36.2 and standard deviation of 6.0 during days 8 through 35 which it will be seen later is the time that Sample Bag No.2 was simultaneously tested along with Bag Sample No. 1 not including the start-up period of both bag samples. The second compartment is shown to have varied from 62 to 74% relative humidity during the time between days 8 through 35 with a mean of 66.5 and a standard deviation of 3.0. The value for Delta RH as calculated varied from -6 to +5 with a mean of -1.3 and a standard deviation of 2.5 during the same period. The test data shows that the bag of the present invention has the ability to maintain a targeted relative humidity over an extended period of time whereby the variation in the relative humidity of the second compartment was dampened to half the variation of the ambient conditions. This dampening the variation of the relative humidity within the second compartment can be contributed to the natural tendency of the second compartment relative humidity to seek the half-way or midpoint between the relative humidity of the first compartment and the ambient conditions. The relative humidity standard deviations of the second compartment (3.0) and of the ambient conditions (6.0) show this halving phenomenon as do the values of Delta RH. The values for Delta RH show this halving tendency because they remain very close to zero. throughout the test. This is important because the near zero values of Delta RH show that the difference between the relative humidity variation of the second compartment versus the ambient conditions and the relative humidity variation of the first compartment versus the second compartment are substantially equal. As shown in FIG. 9A this occurs when the line graph of the relative humidity of the second compartment is half way between the line graph of the relative humidity of the first compartment and the ambient conditions. Bag Sample No. 1 has this natural tendency to seek the half way point shown in the graphs of FIG. 9A because the moisture vapor transmission rate properties of the inner panel between the first and second compartments is the same as that of the second outer panel between the second compartment and the surroundings. That is the flow of moisture from the first compartment that contains the hydrated pad through the inner panel into the dryer storage space of the second compartment is substantially equal to the flow of moisture vapor from the second compartment to the even dryer surroundings.

Bag Sample No.2 was tracked over a thirty three day period whereby the relative humidity of the first compartment, the second compartment, and the ambient conditions were recorded. Bag Sample No.2 was constructed according to FIG. 1 and 2 with a targeted relative humidity in the storage compartment of 70%. The first outer panel of Bag Sample No.2 was constructed from a 0.003 inch thick two layer high density polyethylene film with a moisture vapor transmission rate of 0.3 gm-mil/100 sq in./24 hr resulting in a MVTR for the panel of about 0.1 gm/100 sq. in./24 hr. As with the first sample the film was made by the blown extrusion process and the two layers were adhesively connected together by a lamination process. The inner panel was constructed from a 0.0015 inch thick monolayer low density polyethylene blown film with a moisture vapor transmission rate of 1.2 gm-mil/100 sq in./24 hr resulting in a MVTR for the panel of 0.8 gm/100 sq. in./24 hr. The second outer panel is constructed from the same monolayer low density polyethylene blown film, but differs from that of the first sample in that the panel is twice as thick and therefore has substantially two times the moisture vapor barrier properties as that of the inner panel, that is approximately 0.4 gm/day/100 sq in. The results for Bag Sample No.2, which are arranged in the same five categories as was described above for Bag Sample No. 1, are shown numerically in Table 2 below and graphically in FIG. 9B.

| DAY | 1ST COMP. RH (Percent) | 2ND COMP. RH (Percent) | AMBIENT RH (Percent) | RH DELTA |
|---|---|---|---|---|
| 1 | 76 | 48 | 37 | −17 |
| 2 | 87 | 55 | 34 | −11 |
| 3 | 95 | 64 | 40 | −7 |
| 4 | 96 | 68 | 41 | −1 |
| 5 | 98 | 65 | 32 | 0 |
| 6 | 98 | 65 | 32 | 0 |
| 7 | 98 | 64 | 29 | 1 |
| 8 | 98 | 64 | 29 | 1 |
| 9 | 98 | 64 | 30 | 0 |
| 10 | 98 | 65 | 31 | 1 |
| 11 | 98 | 66 | 32 | 2 |
| 12 | 98 | 67 | 35 | 1 |
| 13 | 98 | 69 | 37 | 3 |
| 14 | 98 | 69 | 37 | 3 |
| 15 | 98 | 69 | 33 | 7 |
| 16 | 98 | 67 | 30 | 6 |
| 17 | 98 | 67 | 31 | 5 |
| 18 | 98 | 66 | 30 | 4 |
| 19 | 98 | 67 | 31 | 5 |
| 20 | 98 | 68 | 32 | 6 |
| 21 | 98 | 69 | 38 | 2 |
| 22 | 98 | 70 | 41 | 1 |
| 23 | 98 | 71 | 43 | 1 |
| 24 | 98 | 74 | 48 | 2 |
| 25 | 98 | 73 | 42 | 6 |
| 26 | 98 | 76 | 52 | 2 |
| 27 | 98 | 77 | 44 | 12 |
| 28 | 98 | 76 | 40 | 14 |
| 29 | 98 | 72 | 36 | 10 |
| 30 | 98 | 71 | 36 | 8 |
| 31 | 98 | 72 | 41 | 5 |
| 32 | 98 | 72 | 41 | 5 |
| 33 | 98 | 73 | 41 | 7 |

Figure 9B:
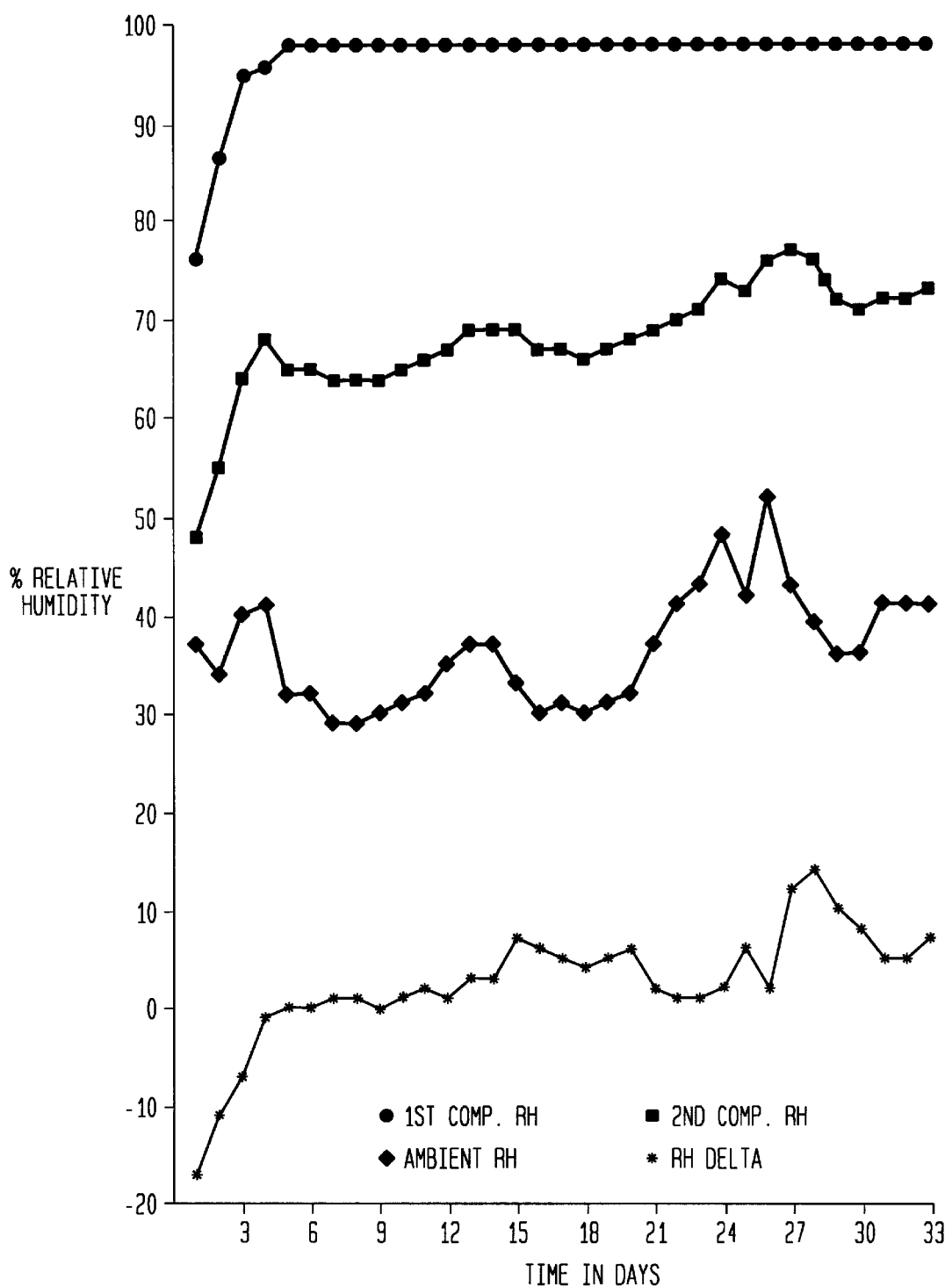

Table 1 and the graphs of FIG. 9B show that the relative humidity of the first compartment was a constant 98% throughout the test except during the initial start-up period of the first four days. The ambient conditions outside Bag Sample No.2 varied from a low of 29% to a high of 52% with a mean of 36.2 and standard deviation of 6.0 during days 6 through 33 which coincides exactly with the testing of the first bag sample. The second compartment is shown to have varied from 64 to 78% relative humidity during the time between days 6 through 33 with a mean of 69 and a standard deviation of 3.7. The values for Delta RH as calculated varied from 0 to +14 with a mean of 3.8 and a standard deviation of 3.7 during the same period. The test data of Bag Sample No. 2 shows that the bag of the present invention has the ability to maintain a targeted relative humidity over an extended period of time whereby the variation in the relative humidity of the second compartment was dampened to 61.7% of the variation of the ambient conditions as indicated by the ratio of the relative humidity standard deviation of the second compartment (3.7) and of the ambient conditions (6.0). This level of dampening of the variation of the relative humidity within the second compartment is substantially different than was found in the test of Bag Sample No. 1 and can be contributed to the imbalance between the moisture vapor barrier properties of the inner panel and the second outer panel. The values for Delta RH show this same difference because they no longer remain as close to zero. This result is of particular importance because the values of Delta RH for Bag Sample No.2 show that the difference between the relative humidity variation of the second compartment versus the ambient conditions and the relative humidity variation of the first compartment versus the second compartment are substantially higher than Bag Sample No. 1 when both were exposed to the same ambient conditions. As shown in FIG. 9B the line graph of the relative humidity of the second compartment is substantially greater than half way between the line graph of the relative humidity of the first compartment and the ambient conditions. The second compartment of Bag Sample No.2 has this natural tendency to seek a point of relative humidity greater than the half-way point between the relative humidity of the first compartment and the surroundings as shown in the graphs of FIG. 9B because the moisture vapor transmission properties of the inner panel between the first and second compartments is now half that of the second outer panel between the second compartment and the surroundings. Therefore, the flow of moisture from the first compartment that contains the hydrated pad through the inner panel into the dryer storage space of the second compartment is substantially greater (23% greater) than the flow of moisture vapor from the second compartment to the even dryer surroundings resulting in the storage compartment reaching and maintaining a substantially higher relative humidity level than the first bag sample when both were exposed to the same ambient conditions.

It has been shown by the teachings of the present invention that a storage bag can be designed to maintain a predetermined humidity level within its storage compartment by utilizing a moisture emitting pad placed in an enclosure, whereby the bag with pad has the ability to regulate the flow of moisture to the storage compartment in relationship to the flow of moisture out of the storage compartment into the surroundings so as to avoid over humidification or dehydration of the storage compartment when exposed to moderate humidity conditions.

The bags and film of the invention are constructed from plastic film well known in the art. Preferably, the bags or pad enclosures of the invention are constructed from flexible thermoplastic film such as polyvinylidene chloride, polyethylene, polyethylene copolymers(ethylene vinyl acetate),polyamide, polypropylene, and the like. A particularly preferred thermoplastic film is 0.001 to 0.004 of an inch thick polyethylene. Also cellulosic films could also be utilized to make the bags or pad enclosures of the invention.

The bags and film of the invention may be constructed by any method or methods known in the art. A preferred method of joining panels 12, 14, 15, or 112, 114, 115 or 212, 214, 215, or 312, 314, 315 is by heat sealing, but other known methods could also be used such as the use of adhesives. Furthermore, the bags and pads of the invention may be made in any desired shape to also include side or bottom gussets as is well known in the art.

Many of the elements of the various embodiments of the present invention could be interchanged with one another such as pad 30 could be interchanged with pad 130 or 330 or any of the pads could be interchanged with one another except 230 due to its larger size. Therefore, many combinations and substitutions are possible as is made apparent from the teachings of my invention. Accordingly, the scope of my invention should be determined not by the embodiments illustrated, but by the following appended claims and their legal equivalent.

What is claimed is:

1. An improved storage bag in combination with a moisture emitting pad comprising:
    a. a bag having a first outer panel, a second outer panel and an inner panel constructed from plastic film, said panels all being connected together by substantially continuous seams to form a storage bag with a first compartment and a second compartment;
    b. a first perimeter formed around said first compartment by said first outer panel being connected to said inner panel at a continuous seam along all but one portion of said first perimeter thereby creating a first bag mouth;
    c. a second perimeter formed around said second compartment by said second outer panel being connected to said inner panel at a continuous seam along all but one portion of said second perimeter thereby creating a second bag mouth;
    d. hydrated pad means located in said first compartment for emitting moisture vapor, said first compartment being greater than 95% relative humidity, whereby said moisture vapor has the ability to flow out of said first compartment without the ability for substantially any moisture vapor to flow into said first compartment;
    e. said first bag mouth being closeable by connecting said first outer panel to said inner panel thereby totally enclosing said pad means;
    f. said inner panel having a moisture vapor transmission rate relative to a moisture vapor transmission rate of said second panel whereby the flow of moisture vapor into said second compartment from said first compartment relative to the flow of moisture vapor out of said second compartment into the surrounding environment causes the relative humidity of said second compartment to reach a predetermined level when said storage bag is in a surrounding environment having a relative humidity that is lower than said relative humidity of said first compartment;
    g. said inner panel having a moisture vapor transmission rate in the range of about 0.3 to about 5.0, grams/mil/24 hours/100 square inches; and
    h. said second outer panel having a moisture vapor transmission rate in the range of about 0.3 to about 5.0 grams/mil/24 hours/100 square inches.

2. An improved storage bag as in claim 1 wherein said hydrated pad means is made from a distilled material that has been hydrated by distilled water.

3. An improved storage bag as in claim 1 wherein said hydrated pad means is covered in a hermetically sealed plastic enclosure.

4. An improved storage bag as in claim 1 wherein said inner panel is made from a film that has a moisture vapor transmission rate of between 0.3 to 3.0 gm/mil 100 sq. in./24 hr. at 23 degrees Centigrade.

5. An improved storage bag as in claim 1 wherein one of said outer panels is made from a film that has a moisture vapor transmission rate of less than 1.0 gm-mil/100 sq. in./24 hr. at 23 degrees Centigrade.

6. An improved storage bag as in claim 1 further comprising a flexible reclosable fastener strip means made into the opening of at least one of said compartments thereby making said bag reclosable.

7. An improved storage bag as in claim 1 wherein said hydrated pad means is secured to one of said panels that forms said first compartment.

8. The storage bag of claim 1, wherein the moisture vapor transmission rate of said inner panel is greater than the moisture vapor transmission rate of said second outer panel.

9. The storage bag of claim 1, wherein the moisture vapor transmission rate of said inner panel is about equal to the moisture vapor transmission rate of said second outer panel.

10. The storage bag of claim 1, wherein the moisture vapor transmission rate of said inner panel and said second outer panel is in the range of about 0.8 to about 3.0 grams/mil/24 hours/100 square inches.

11. The storage bag of claim 10, wherein said first bag mouth is closed off by a non-operable seam formed between said first outer panel and said inner panel.

12. The storage bag of claim 1, wherein said hydrated pad means is substantially free of a salt solution.

13. A storage bag in combination with a moisture emitting pad for humidifying tobacco products, said storage bag comprising:
    a. a bag having a first outer panel, a second outer panel, and an inner panel therebetween constructed from polymer film, said panels being connected together to form said storage bag with a first compartment and a second compartment;
    b. a moisture vapor emitting hydrated pad located in first said compartment, said first compartment being greater than 95% relative humidity, whereby said moisture vapor has the ability to flow out of said first compartment without the ability for substantially any moisture vapor to flow into said first compartment;
    c. said inner panel having a moisture vapor transmission rate relative to the moisture vapor transmission rate of said second outer panel whereby the flow of moisture vapor into said second compartment from said first compartment relative to the flow of moisture vapor out of said second compartment into the surrounding environment causes the relative humidity of said second compartment to be maintained between about 62% to about 78% when said storage bag is maintained in a surrounding environment having a relative humidity in the range between about 20% and about 60%;

d. said inner panel formed from a polymer film in the range of about 1–4 mils. thick and having a moisture vapor transmission rate in the range of about 0.3 to about 5.0 grams/mil/24 hours/100 square inches; and e. said second outer panel formed from a polymer film in the range of about 1–4 mils. thick and having a moisture vapor transmission rate in the range of about 0.3 to about 5.0 grams/mil/24 hours/100 square inches.

14. The storage bag of claim 13, further including a first substantially continuous seam formed around at least a portion of said first compartment by said first outer panel being connected to said inner panel along all but one portion of said first outer panel and said inner panel thereby creating a first bag mouth.

15. The storage bag of claim 14, wherein said first bag mouth is closed off thereby totally enclosing said pad.

16. The storage bag of claim 14, wherein said first bag mouth is closed off by a substantially continuous non-operable seam.

17. The storage bag of claim 14, wherein said first bag mouth is closed off by a recloseable seal.

18. The storage bag of claim 13, further including a second substantially continuous seam formed around said second compartment by said second outer panel being connected to said inner panel along all but one portion of said second outer panel and said inner panel thereby creating a second bag mouth.

19. The storage bag of claim 18, wherein said second bag mouth is closed off by a recloseable seal.

20. The storage bag of claim 13, wherein said panels are connected together about hermetic seams.

21. The storage bag of claim 13, wherein said hydrated pad is made from a material that has been treated with an anti-microbial agent.

22. The storage bag of claim 13, wherein said hydrated pad is secured to one of said panels that form said first compartment.

23. The storage bag of claim 13, wherein said polymer film comprises polyethylene film.

24. The storage bag of claim 13, wherein the moisture vapor transmission rate of said inner panel is greater than the moisture vapor transmission rate of said second outer panel.

25. The storage bag of claim 13, wherein the moisture vapor transmission rate of said inner panel is equal to or less than the moisture vapor transmission rate of said second outer panel.

26. The storage bag of claim 13, wherein said pad is hydrated with water.

27. The storage bag of claim 13, wherein said pad is substantially free of a salt solution.

28. The storage bag of claim 13, wherein the moisture vapor transmission rate of said inner panel is in the range of about 0.8 to about 3.0 grams/mil/24 hours/100 square inches.

29. The storage bag of claim 13, wherein the moisture vapor transmission rate of said second outer panel is in the range of about 0.8 to about 3.0 grams/mil/24 hours/100 square inches.

30. A storage bag in combination with a moisture emitting pad for humidifying products stored therein, comprising:

a. a bag having a first outer panel, a second outer panel, and an inner panel therebetween constructed from plastic film, said panels being connected together by seams to form a storage bag with a first compartment and a second compartment;

b. a moisture vapor emitting pad located in said first compartment;

c. said inner panel and said second outer panel being formed from a plastic film having a moisture vapor transmission rate whereby the flow of moisture vapor out of said second compartment into the surrounding environment causes the relative humidity of said second compartment to reach a predetermined level when said storage bag is maintained in a surrounding environment having a relative humidity that is lower than said relative humidity within said first compartment; and d. the moisture vapor transmission rate of said second outer panel being sufficient whereby said second compartment relative humidity is affected by said relative humidity of said surrounding environment, with said relative humidity of said second compartment being directly proportional to, but not equal to, said relative humidity of said surrounding environment when said storage bag is at equilibrium wherein said moisture vapor transmission rate of said inner panel and said second outer panel is in the range of about 0.3 to about 5.0 grams/mil/24 hours/100 square inches.

31. The storage bag of claim 30, wherein said moisture vapor transmission rate of said inner panel and said second outer panel is in the range of about 0.8 to about 3.0 grams/mil/100 square inches.

32. The storage bag of claim 30, wherein said pad is made from a material that has been treated by an anti-microbial agent.

33. The storage bag of claim 30, wherein said pad is covered in a hermetically sealed plastic enclosure.

34. The storage bag of claim 30, wherein said pad is secured to one of said panels that form said first compartment.

35. The storage bag of claim 30, wherein a portion of said seam forming said first compartment being open to create a first bag mouth and a portion of said seam forming said second compartment being open to create a second bag mouth.

36. The storage bag of claim 35, wherein said seam forming said first compartment connects said first outer panel to said inner panel and said seam forming said second compartment connects said second outer panel to said inner panel.

37. The storage bag of claim 35, wherein said seam forming said first compartment connects said first outer panel to said second outer panel and said seam forming said second compartment connects said second outer panel to said inner panel.

38. The storage bag of claim 37, wherein a portion of at least one of said seams is formed from an integral fold.

39. The storage bag of claim 30, wherein said pad is hydrated with water.

40. The storage bag of claim 30, wherein said pad is substantially free of a salt solution.

41. A storage bag in combination with a moisture emitting pad for humidifying products stored therein, said combination comprising:

a bag constructed from polymer material forming a first compartment for storing a product therein and a second compartment storing a moisture emitting pad therein, said bag including an outer panel of polymer material separating said first compartment from the surrounding environment and an inner panel of polymer material separating said first compartment from said second compartment, said inner panel having a moisture vapor transmission rate relative to the moisture vapor transmission rate of said outer panel whereby the flow of moisture into said first compartment from said second compartment relative to the flow of moisture out of said first compartment into the surrounding environment maintains the relative humidity of said first compartment within a predetermined range higher than the relative humidity of the surrounding environment and lower than the relative humidity in said second compartment, wherein the moisture vapor transmission rate of said inner panel and said outer panel are in the range of about 0.3 to about 5.0 grams/mil/24 hours/100 square inches.

42. The storage bag of claim 41, wherein the moisture vapor transmission rate of said inner panel is greater than the moisture vapor transmission rate of said outer panel.

43. The storage bag of claim 41, wherein the moisture vapor transmission rate of said inner panel is equal to or less than the moisture vapor transmission rate of said outer panel.

44. The storage bag of claim 41, wherein said pad is hydrated with water.

45. The storage bag of claim 41, wherein said pad maintains a relative humidity in said second compartment greater than 95%.

46. The storage bag of claim 41, wherein said inner panel and said outer panel have a thickness in the range of about 1–4 mils.

47. The storage bag of claim 41, wherein said inner panel and said outer panel comprise a polymer film selected from the group consisting of polyvinylidene chloride, polyethylene, polyethylene copolymers (ethylene vinyl acetate), polyamide, polypropylene and composite layers thereof.

48. The storage bag of claim 41, wherein said second compartment is hermetically sealed.

49. The storage bag of claim 41, wherein said first compartment has an openable closure for hermetically sealing a product stored therein.

50. The storage bag of claim 41, further including a second outer panel of polymer material separating said second compartment from the surrounding environment.

51. The storage bag of claim 41, wherein said relative humidity of said first compartment is maintained in the range of about 62% to about 78%.

52. The storage bag of claim 41, wherein the moisture vapor transmission rate of said inner panel is in the range of about 0.8 to 3.0 grams/mil/24 hours/100 square inches.

53. The storage bag of claim 41, wherein the moisture vapor transmission rate of said outer panel is in the range of about 0.8 to 3.0 grams/mil/24 hours/100 square inches.

54. The storage bag of claim 41, wherein the moisture transmission rate of said inner panel and said outer panel are about equal to each other whereby the relative humidity in said first compartment is maintained approximately at the mid point between the relative humidity of said first compartment and the surrounding environment.

55. The storage bag of claim 41, wherein said pad is substantially free of a salt solution.

56. The storage bag of claim 41, wherein said products comprise tobacco products within said first compartment.

57. A storage bag in combination with a moisture emitting pad for humidifying products stored therein, comprising:

a. a bag having a first outer panel, a second outer panel, and an inner panel therebetween constructed from plastic film, said panels being connected together by seams to form a storage bag with a first compartment and a second compartment;

b. a moisture vapor emitting pad located in said first compartment;

c. said inner panel and said second outer panel being formed from a plastic film having a moisture vapor transmission rate whereby the flow of moisture vapor out of said second compartment into the surrounding environment causes the relative humidity of said second compartment to reach a predetermined level when said storage bag is maintained in a surrounding environment having a relative humidity that is lower than said relative humidity within said first compartment; and d. the moisture vapor transmission rate of said second outer panel being sufficient whereby said second compartment relative humidity is affected by said relative humidity of said surrounding environment, with said relative humidity of said second compartment being directly proportional to, but not equal to, said relative humidity of said surrounding environment when said storage bag is at equilibrium, wherein said moisture vapor transmission rate of said inner panel and said second outer panel is in the range of about 0.8 to about 3.0 grams/mil/24 hours/100 square inches.

58. The storage bag of claim 57, wherein said pad is secured to one of said panels that form said first compartment.

59. The storage bag of claim 57, wherein a portion of said seam forming said first compartment being open to create a first bag mouth and a portion of said seam forming said second compartment being open to create a second bag mouth.

60. The storage bag of claim 59, wherein said seam forming said first compartment connects said first outer panel to said inner panel and said seam forming said second compartment connects said second outer panel to said inner panel.

61. The storage bag of claim 59, wherein said seam forming said first compartment connects said first outer panel to said second outer panel and said seam forming said second compartment connects said second outer panel to said inner panel.

62. The storage bag of claim 61, wherein a portion of at least one of said seams is formed from an integral fold.

63. A storage bag in combination with a moisture emitting pad for humidifying products stored therein, said combination comprising:

a bag constructed from polymer material forming a first compartment for storing a product therein and a second compartment storing a moisture emitting pad therein, said bag including an outer panel of polymer material separating said first compartment from the surrounding environment and an inner panel of polymer material separating said first compartment from said second compartment, said inner panel having a moisture vapor transmission rate relative to the moisture vapor transmission rate of said outer panel whereby the flow of moisture into said first compartment from said second compartment relative to the flow of moisture out of said first compartment into the surrounding environment maintains the relative humidity of said first compartment within a predetermined range higher than the relative humidity of the surrounding environment and lower than the relative humidity in said second compartment, wherein said relative humidity of said first compartment is maintained in the range of about 62% to about 78%.

64. The storage bag of claim 63, wherein the moisture vapor transmission rate of said inner panel is greater than the moisture vapor transmission rate of said outer panel.

65. The storage bag of claim 63, wherein the moisture vapor transmission rate of said inner panel is equal to or less than the moisture vapor transmission rate of said outer panel.

66. The storage bag of claim 63, wherein said pad maintains a relative humidity in said second compartment greater than 95%.

67. The storage bag of claim 63, wherein said inner panel and said outer panel have a thickness in the range of about 1–4 mils.

68. The storage bag of claim 63, wherein said inner panel and said outer panel comprise a polymer film selected from the group consisting of polyvinylidene chloride, polyethylene, polyethylene copolymers (ethylene vinyl acetate), polyamide, polypropylene and composite layers thereof.

69. The storage bag of claim 63, wherein said first compartment has an openable closure for hermetically sealing a product stored therein.

70. The storage bag of claim 63, further including a second outer panel of polymer material separating said second compartment from the surrounding environment.

71. The storage bag of claim 63, wherein the moisture vapor transmission rate of said inner panel is in the range of about 0.8 to 3.0 grams/mil/24 hours/100 square inches.

72. The storage bag of claim 65, wherein the moisture vapor transmission rate of said outer panel is in the range of about 0.8 to 3.0 grams/mil/24 hours/100 square inches.

73. The storage bag of claim 63, wherein the moisture transmission rate of said inner panel and said outer panel are about equal to each other whereby the relative humidity in said first compartment is maintained approximately at the mid point between the relative humidity of said first compartment and the surrounding environment.

74. The storage bag of claim 63, wherein said products comprise tobacco products within said first compartment.

75. A storage bag in combination with a moisture emitting pad for humidifying products stored therein, said combination comprising:

a bag constructed from polymer material forming a first compartment for storing a product therein and a second compartment storing a moisture emitting pad therein, said bag including an outer panel of polymer material separating said first compartment from the surrounding environment and an inner panel of polymer material separating said first compartment from said second compartment, said inner panel having a moisture vapor transmission rate relative to the moisture vapor transmission rate of said outer panel whereby the flow of moisture into said first compartment from said second compartment relative to the flow of moisture out of said first compartment into the surrounding environment maintains the relative humidity of said first compartment within a predetermined range higher than the relative humidity of the surrounding environment and lower than the relative humidity in said second compartment, wherein the moisture vapor transmission rate of said inner panel is in the range of about 0.8 to 3.0 grams/mil/24 hours/100 square inches.

76. The storage bag of claim 75, wherein the moisture vapor transmission rate of said inner panel is greater than the moisture vapor transmission rate of said outer panel.

77. The storage bag of claim 75, wherein the moisture vapor transmission rate of said inner panel is equal to or less than the moisture vapor transmission rate of said outer panel.

78. The storage bag of claim 75, wherein said pad maintains a relative humidity in said second compartment greater than 95%.

79. The storage bag of claim 75, wherein said inner panel and said outer panel have a thickness in the range of about 1–4 mils.

80. The storage bag of claim 75, wherein said inner panel and said outer panel comprise a polymer film selected from the group consisting of polyvinylidene chloride, polyethylene, polyethylene copolymers (ethylene vinyl acetate), polyamide, polypropylene and composite layers thereof.

81. The storage bag of claim 75, wherein said first compartment has an openable closure for hermetically sealing a product stored therein.

82. The storage bag of claim 75, further including a second outer panel of polymer material separating said second compartment from the surrounding environment.

83. The storage bag of claim 75, wherein the moisture vapor transmission rate of said outer panel is in the range of about 0.8 to 3.0 grams/mil/24 hours/100 square inches.

84. The storage bag of claim 75, wherein the moisture transmission rate of said inner panel and said outer panel are about equal to each other whereby the relative humidity in said first compartment is maintained approximately at the mid point between the relative humidity of said first compartment and the surrounding environment.

85. The storage bag of claim 75, wherein said products comprise tobacco products within said first compartment.

86. A storage bag in combination with a moisture emitting pad for humidifying products stored therein, said combination comprising:

a bag constructed from polymer material forming a first compartment for storing a product therein and a second compartment storing a moisture emitting pad therein, said bag including an outer panel of polymer material separating said first compartment from the surrounding environment and an inner panel of polymer material separating said first compartment from said second compartment, said inner panel having a moisture vapor transmission rate relative to the moisture vapor transmission rate of said outer panel whereby the flow of moisture into said first compartment from said second compartment relative to the flow of moisture out of said first compartment into the surrounding environment maintains the relative humidity of said first compartment within a predetermined range higher than the relative humidity of the surrounding environment and lower than the relative humidity in said second compartment, wherein the moisture vapor transmission rate of said outer panel is in the range of about 0.8 to 3.0 grams/mil/24 hours/100 square inches.

87. The storage bag of claim 86, wherein the moisture vapor transmission rate of said inner panel is greater than the moisture vapor transmission rate of said outer panel.

88. The storage bag of claim 86, wherein the moisture vapor transmission rate of said inner panel is equal to or less than the moisture vapor transmission rate of said outer panel.

89. The storage bag of claim 86, wherein said pad maintains a relative humidity in said second compartment greater than 95%.

90. The storage bag of claim 86, wherein said inner panel and said outer panel have a thickness in the range of about 1–4 mils.

91. The storage bag of claim 86, wherein said inner panel and said outer panel comprise a polymer film selected from the group consisting of polyvinylidene chloride, polyethylene, polyethylene copolymers (ethylene vinyl acetate), polyamide, polypropylene and composite layers thereof.

92. The storage bag of claim 86, wherein said first compartment has an openable closure for hermetically sealing a product stored therein.

93. The storage bag of claim 86, further including a second outer panel of polymer material separating said second compartment from the surrounding environment.

94. The storage bag of claim 86, wherein the moisture transmission rate of said inner panel and said outer panel are about equal to each other whereby the relative humidity in said first compartment is maintained approximately at the mid point between the relative humidity of said first compartment and the surrounding environment.

95. The storage bag of claim 86, wherein said products comprise tobacco products within said first compartment.

* * * * *

UNITED STATES PATENT AND TRADEMARK OFFICE
CERTIFICATE OF CORRECTION

PATENT NO. : 5,938,012
DATED : August 17, 1999
INVENTOR(S) : Yeager, et al.

Page 1 of 2

It is certified that error appears in the above-identified patent and that said Letters Patent is hereby corrected as shown below:

```
Column 1, line 19, after "conditions" cancel the ",".
Column 1, line 21, "for a" should read --for an--.
Column 1, line 35, after "products" cancel the ",".
Column 1, line 40, after "United States" and "world" insert
--,-- respectively.
Column 1, line 43, after "transportation" insert ",", cancel
"there is" and after "typically" insert --have--.
Column 1, line 54, "surroundings" should read --surrounding--.
Column 1, line 64, "provides" should read --provide--.
Column 1, line 66, "moisten" should read --moistened--.
Column 2, line 26, "for a" should read --for an--.
Column 2, line 27, "like" should read --such as--.
Column 3, line 31, after "means" insert --;--.
Column 3, line 54, "first the" should read --the first--.
Column 4, line 2, "14" should read --1-4--.
Column 5, line 29, after "bag" insert --,--.
Column 5, line 30, "Although" should read --although--.
Column 5, line 37, after "14b" insert --,-- and "Although"
should read --although--.
Column 5, line 66, "Their" should read --There--.
Column 6, line 4, after "shown" insert --in--.
Column 6, line 42, "forth" should read "fourth".
Column 6, line 47, after "of" insert --an--.
Column 7, line 8, "over humidifying" should read --over-
humidifying--.
Column 7, line 21, "12aand" should read "12a and".
Column 7, line 30, "illustrates" should read --illustrate--.
Column 7, line 36, "a" (second occurrence) should read --an--.
```

UNITED STATES PATENT AND TRADEMARK OFFICE
CERTIFICATE OF CORRECTION

PATENT NO. : 5,938,012
DATED : August 17, 1999
INVENTOR(S) : Yeager, et al.

It is certified that error appears in the above-identified patent and that said Letters Patent is hereby corrected as shown below:

```
Column 8, line 14, "an" should read --on--.
Column 8, line 32, "that" should read --than--.
Column 8, line 41, "FIG." should read --FIGS.--.
Column 8, line 44, "FIG." should read --FIGS.--.
Column 8, line 46, "126acould" should read "126a could".
Column 8, line 48, after "pad" insert --;--.
Column 10, line 22, "layer" should read --panel--.
Column 10, line 33, after "outer" insert --panel--.
Column 13, line 5, "half way" should read --halfway--.
Column 13, line 8, "half way" should read --halfway--.
Column 14, line 49, "half way" should read --halfway--.
Column 16, line 16, cancel "distilled".
Column 16, line 47, "non-operable" should read
--non-openable--.
Column 16, lines 60 and 61, "first said" should read --said first--.
Column 17, line 28, "operable" should read --openable--.
Column 18, line 26, after "equilibrium" insert --,--.
Column 19, line 17, "are" should read --is--.
Column 20, line 31, "form" should read --forms--.
Column 21, line 32, "65" should read -63--.
```

Signed and Sealed this

Nineteenth Day of September, 2000

Attest:

Q. TODD DICKINSON

*Attesting Officer*   *Director of Patents and Trademarks*